(12) United States Patent
Leggette et al.

(10) Patent No.: US 11,113,008 B1
(45) Date of Patent: Sep. 7, 2021

(54) DATA RESTORATION USING PARTIALLY ENCODED SLICE REQUESTS

(71) Applicant: Pure Storage, Inc., Mountain View, CA (US)

(72) Inventors: Wesley B. Leggette, Chicago, IL (US); Andrew D. Baptist, Mt. Pleasant, WI (US); Greg R. Dhuse, Chicago, IL (US); Jason K. Resch, Chicago, IL (US); Gary W. Grube, Barrington Hills, IL (US); S. Christopher Gladwin, Chicago, IL (US)

(73) Assignee: Pure Storage, Inc., Mountain View, CA (US)

( * ) Notice: Subject to any disclaimer, the term of this patent is extended or adjusted under 35 U.S.C. 154(b) by 211 days.

(21) Appl. No.: 16/547,809

(22) Filed: Aug. 22, 2019

Related U.S. Application Data

(63) Continuation of application No. 15/823,400, filed on Nov. 27, 2017, now Pat. No. 10,430,122, which is a
(Continued)

(51) Int. Cl.
*G06F 7/02* (2006.01)
*G06F 16/00* (2019.01)
(Continued)

(52) U.S. Cl.
CPC .......... *G06F 3/067* (2013.01); *G06F 11/0709* (2013.01); *H04L 67/1097* (2013.01); *G06F 2211/1028* (2013.01)

(58) Field of Classification Search
CPC ........ G06F 16/23; G06F 16/22; G06F 3/0629; G06F 16/182; G06F 16/27; G06F 3/0631;
(Continued)

(56) References Cited

U.S. PATENT DOCUMENTS 4,092,732 A 5/1978 Ouchi
5,454,101 A 9/1995 Mackay
(Continued)

OTHER PUBLICATIONS

Chung; An Automatic Data Segmentation Method for 3D Measured Data Points; National Taiwan University; pp. 1-8; 1998.
(Continued)

*Primary Examiner* — Bruce M Moser
(74) *Attorney, Agent, or Firm* — Garlick & Markisen; Shayne X. Short

(57) ABSTRACT

A storage unit (SU) includes an interface configured to interface and communicate with a dispersed storage network (DSN), a memory that stores operational instructions, and processing circuitry operably coupled to the interface and to the memory. The processing circuitry is configured to execute the operational instructions to perform various operations and functions. The SU, of a first SU set, receives a partially encoded slice request to restore a set of encoded data slices (EDSs) that are based on first dispersed storage error coding function parameters. The SU generates a decode threshold number of partially EDSs based on the first and second dispersed storage error coding function parameters. The SU then outputs the decode threshold number of partially EDSs to a second SU set to undergo selective combination respectively to generate new EDSs for storage within the SUs of the second decode threshold number of SUs of the second SU set.

20 Claims, 8 Drawing Sheets

Related U.S. Application Data continuation-in-part of application No. 14/102,987, filed on Dec. 11, 2013, now Pat. No. 10,055,441.

(60) Provisional application No. 61/760,962, filed on Feb. 5, 2013.

(51) Int. Cl.
*G06F 3/06* (2006.01)
*H04L 29/08* (2006.01)
*G06F 11/07* (2006.01)

(58) Field of Classification Search
CPC ............... G06F 15/177; H04L 67/1097; H04L 2209/34
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers |
| 5,802,364 | A | 9/1998 | Senator |
| 5,809,285 | A | 9/1998 | Hilland |
| 5,890,156 | A | 3/1999 | Rekieta |
| 5,987,622 | A | 11/1999 | Lo Verso |
| 5,991,414 | A | 11/1999 | Garay |
| 6,012,159 | A | 1/2000 | Fischer |
| 6,058,454 | A | 5/2000 | Gerlach |
| 6,128,277 | A | 10/2000 | Bruck |
| 6,175,571 | B1 | 1/2001 | Haddock |
| 6,192,472 | B1 | 2/2001 | Garay |
| 6,256,688 | B1 | 7/2001 | Suetaka |
| 6,272,658 | B1 | 8/2001 | Steele |
| 6,301,604 | B1 | 10/2001 | Nojima |
| 6,356,949 | B1 | 3/2002 | Katsandres |
| 6,366,995 | B1 | 4/2002 | Vilkov |
| 6,374,336 | B1 | 4/2002 | Peters |
| 6,415,373 | B1 | 7/2002 | Peters |
| 6,418,539 | B1 | 7/2002 | Walker |
| 6,449,688 | B1 | 9/2002 | Peters |
| 6,567,948 | B2 | 5/2003 | Steele |
| 6,571,282 | B1 | 5/2003 | Bowman-Amuah |
| 6,609,223 | B1 | 8/2003 | Wolfgang |
| 6,718,361 | B1 | 4/2004 | Basani |
| 6,760,808 | B2 | 7/2004 | Peters |
| 6,785,768 | B2 | 8/2004 | Peters |
| 6,785,783 | B2 | 8/2004 | Buckland |
| 6,826,711 | B2 | 11/2004 | Moulton |
| 6,879,596 | B1 | 4/2005 | Dooply |
| 7,003,688 | B1 | 2/2006 | Pittelkow |
| 7,024,451 | B2 | 4/2006 | Jorgenson |
| 7,024,609 | B2 | 4/2006 | Wolfgang |
| 7,080,101 | B1 | 7/2006 | Watson |
| 7,103,824 | B2 | 9/2006 | Halford |
| 7,103,915 | B2 | 9/2006 | Redlich |
| 7,111,115 | B2 | 9/2006 | Peters |
| 7,140,044 | B2 | 11/2006 | Redlich |
| 7,146,644 | B2 | 12/2006 | Redlich |
| 7,171,493 | B2 | 1/2007 | Shu |
| 7,222,133 | B1 | 5/2007 | Raipurkar |
| 7,240,236 | B2 | 7/2007 | Cutts |
| 7,272,613 | B2 | 9/2007 | Sim |
| 7,636,724 | B2 | 12/2009 | De La Torre |
| 8,335,918 | B2 | 12/2012 | Shon |
| 2002/0062422 | A1 | 5/2002 | Butterworth |
| 2002/0166079 | A1 | 11/2002 | Ulrich |
| 2003/0018927 | A1 | 1/2003 | Gadir |
| 2003/0037261 | A1 | 2/2003 | Meffert |
| 2003/0065617 | A1 | 4/2003 | Watkins |
| 2003/0084020 | A1 | 5/2003 | Shu |
| 2004/0024963 | A1 | 2/2004 | Talagala |
| 2004/0122917 | A1 | 6/2004 | Menon |
| 2004/0215998 | A1 | 10/2004 | Buxton |
| 2004/0228493 | A1 | 11/2004 | Ma |
| 2005/0015471 | A1 | 1/2005 | Zhang |
| 2005/0100022 | A1 | 5/2005 | Ramprashad |
| 2005/0114594 | A1 | 5/2005 | Corbett |
| 2005/0125593 | A1 | 6/2005 | Karpoff |
| 2005/0131993 | A1 | 6/2005 | Fatula, Jr. |
| 2005/0132070 | A1 | 6/2005 | Redlich |
| 2005/0144382 | A1 | 6/2005 | Schmisseur |
| 2005/0229069 | A1 | 10/2005 | Hassner |
| 2006/0047907 | A1 | 3/2006 | Shiga |
| 2006/0136448 | A1 | 6/2006 | Cialini |
| 2006/0156059 | A1 | 7/2006 | Kitamura |
| 2006/0224603 | A1 | 10/2006 | Correll, Jr. |
| 2007/0079081 | A1 | 4/2007 | Gladwin |
| 2007/0079082 | A1 | 4/2007 | Gladwin |
| 2007/0079083 | A1 | 4/2007 | Gladwin |
| 2007/0088970 | A1 | 4/2007 | Buxton |
| 2007/0174192 | A1 | 7/2007 | Gladwin |
| 2007/0214285 | A1 | 9/2007 | Au |
| 2007/0234110 | A1 | 10/2007 | Soran |
| 2007/0283167 | A1 | 12/2007 | Venters, III |
| 2008/0046748 | A1 | 2/2008 | Fujimoto |
| 2009/0094251 | A1 | 4/2009 | Gladwin |
| 2009/0094318 | A1 | 4/2009 | Gladwin |
| 2010/0023524 | A1 | 1/2010 | Gladwin |
| 2011/0107026 | A1 | 5/2011 | Quigley |
| 2012/0084506 | A1* | 4/2012 | Colgrove ............ G06F 11/1076 711/114 |
| 2013/0007091 | A1 | 1/2013 | Rao |
| 2013/0031256 | A1 | 1/2013 | Hampel |
| 2013/0031414 | A1 | 1/2013 | Dhuse |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

(56) References Cited

OTHER PUBLICATIONS

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

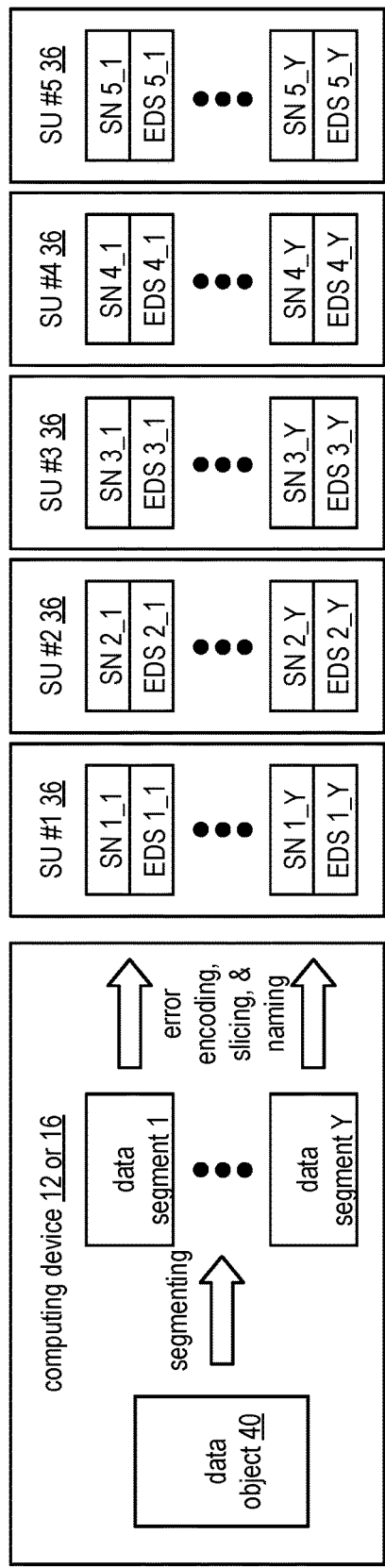
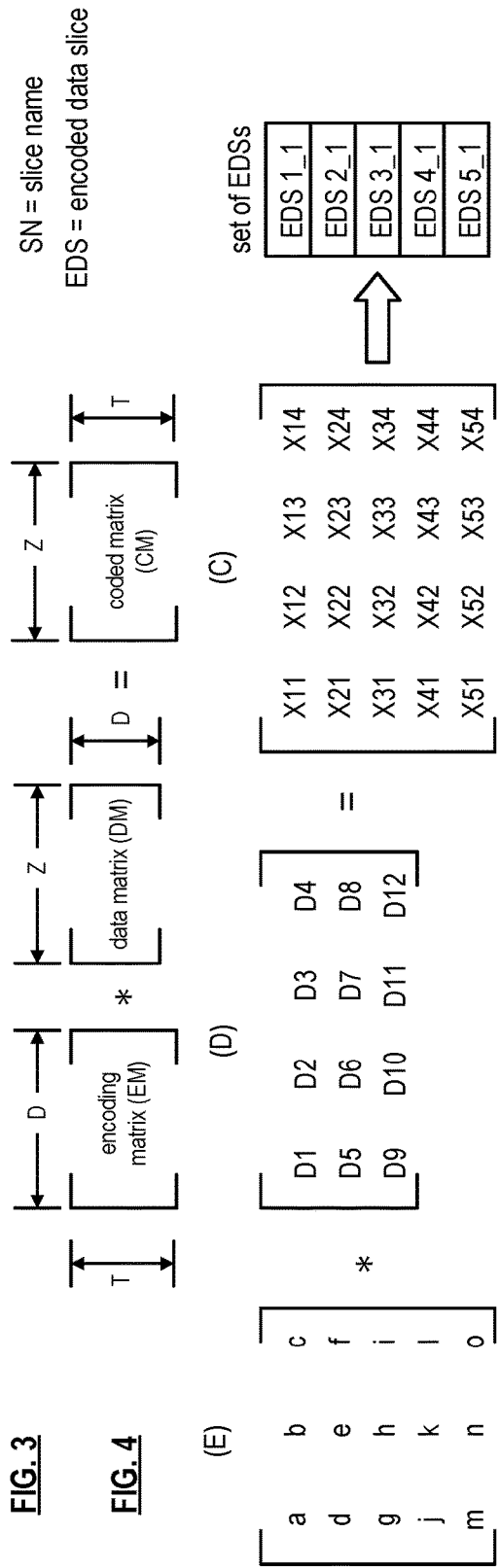
FIG. 3
FIG. 4
FIG. 5
FIG. 6

DATA RESTORATION USING PARTIALLY ENCODED SLICE REQUESTS

CROSS REFERENCE TO RELATED PATENTS

The present U.S. Utility Patent Application also claims priority pursuant to 35 U.S.C. § 120, as a continuation of U.S. Utility patent application Ser. No. 15/823,400, entitled "USING PARTIAL REBUILDING TO CHANGE INFORMATION DISPERSAL ALGORITHM (IDA)," filed Nov. 27, 2017, pending, which is a continuation-in-part (CIP) of U.S. Utility patent application Ser. No. 14/102,987, entitled "UPDATING SHARED GROUP INFORMATION IN A DISPERSED STORAGE NETWORK," filed Dec. 11, 2013, now U.S. Pat. No. 10,055,441 on Aug. 21, 2018, which claims priority pursuant to 35 U.S.C. § 119(e) to U.S. Provisional Application No. 61/760,962, entitled "MANAGING A DISPERSED STORAGE NETWORK POWER CONSUMPTION," filed Feb. 5, 2013, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

The prior art does not provide adequate means by which data may be reproduced effectively and efficiently based on different data storage mechanisms. There exists room for improvement in the art of data storage systems including those related to replicated data storage systems.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
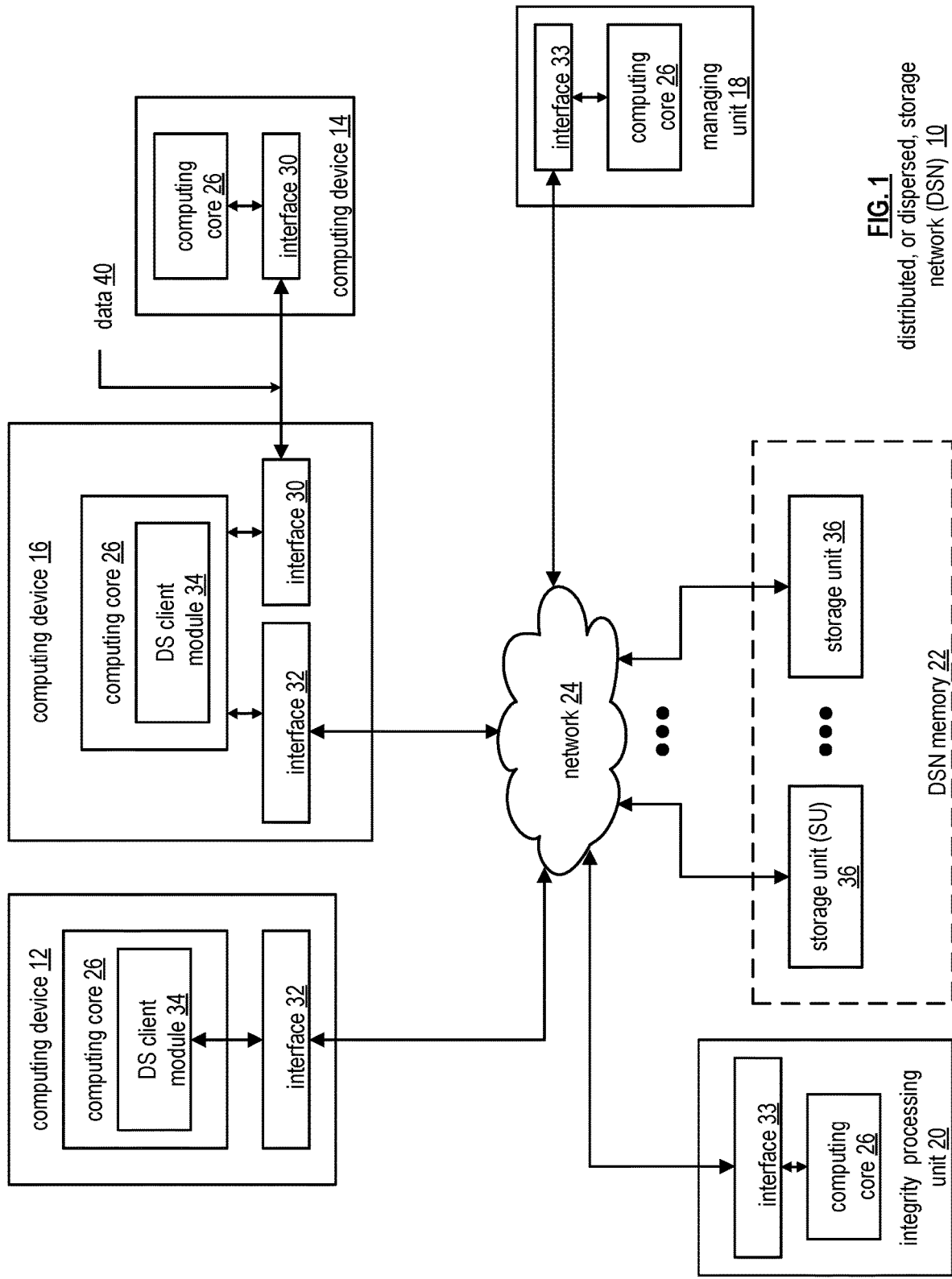
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
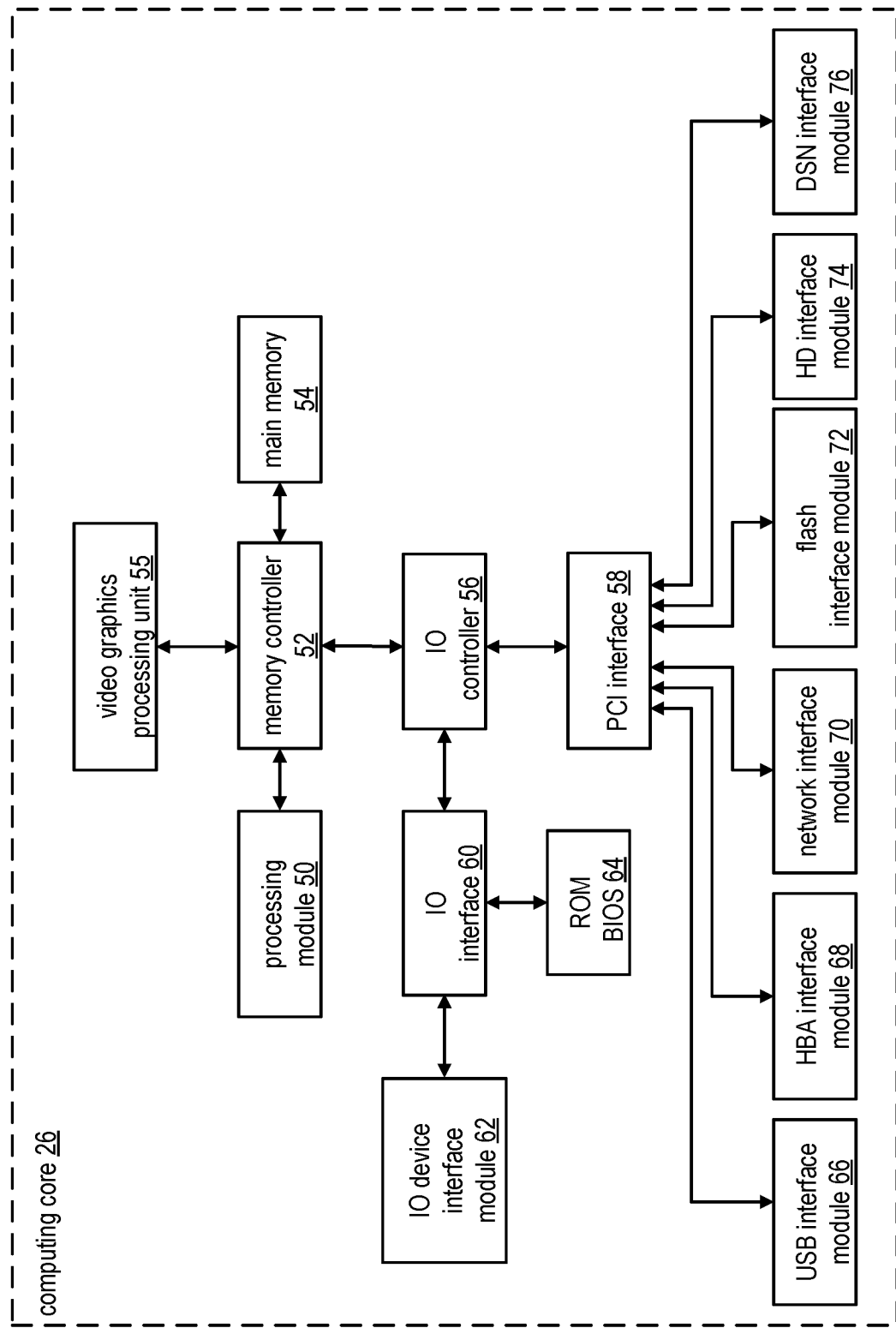
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
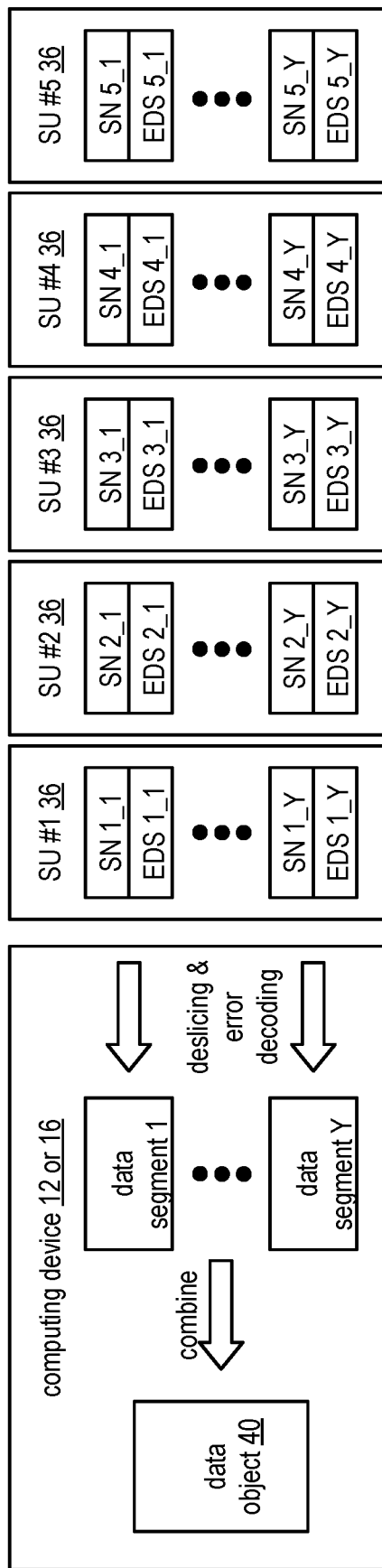
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
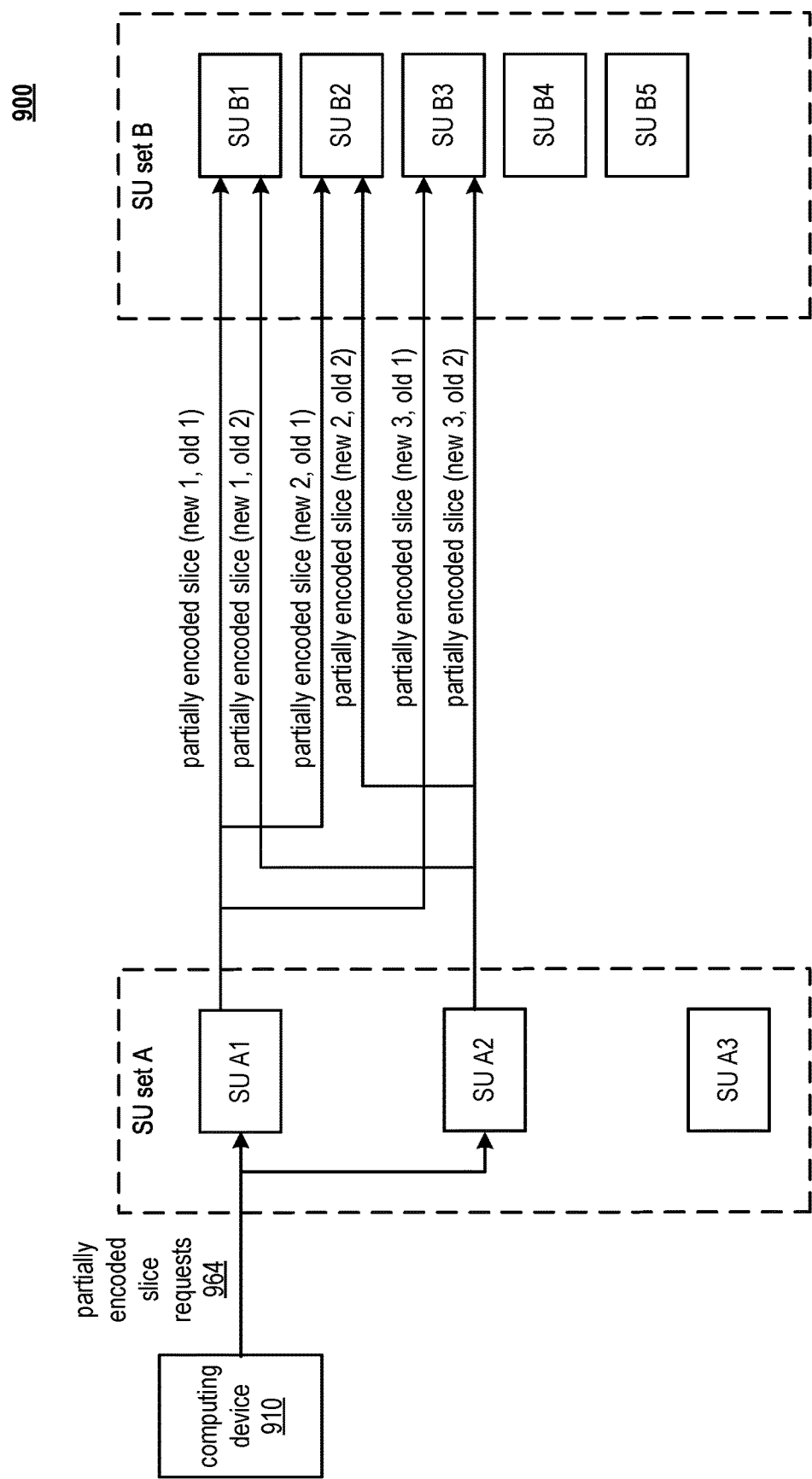
FIG. 9 is a schematic block diagram of another embodiment of a distributed computing system in accordance with the present invention.

FIG. 9 is a schematic block diagram of another embodiment of a distributed computing system in accordance with the present invention. This diagram includes a schematic block diagram of another embodiment of a distributed computing system that includes a computing device and at least two storage unit (SU) sets A and B. Each SU set includes a set of SUs. Each SU may be implemented by one or more of a storage unit (SU), a storage server, a distributed computing server, a memory module, a memory device, a user device, a computing device, and a DS processing unit. The computing device may be implemented utilizing one or more of a computing device, a SU, a dispersed storage (DS) unit, a storage server, a distributed computing server, a user device, a DS processing unit, and a SU of the at least two SU sets. Each SU set includes a number of SUs in accordance with a pillar width number of a corresponding dispersed storage error coding function parameters. For example, SU set A includes three SUs A1, A2, and A3 when a corresponding pillar width of SU set A is three. As another example, SU set B includes five SUs B1-B5 when a corresponding pillar width of SU set B is five. Alternatively, SU sets A and B may share a common set of SUs.

The system functions to change first dispersed storage error coding function parameters for data stored as a plurality of sets of encoded data slices (EDSs) in SU set A transforming the plurality of EDSs stored in SU set A to a plurality of EDSs stored in SU set B in accordance with second dispersed storage error coding function parameters. For example, slices stored in SU set A with the pillar width of three is transformed into slices stored in SU set B with the pillar width of five.

The computing device determines to restore data stored in SU set A width different dispersed storage error coding function parameters based on one or more of a reliability level, a performance level, a storage efficiency level, and storage cost. The computing device issues partially encoded slice requests to at least a decode threshold number of SUs of SU set A when determining to restore the data. The partially encoded slice requests include one or more of a first decoding matrix, a second encoding matrix, a slice name, a slice name range, the first dispersed storage error coding function parameters, the second dispersed storage error coding function parameters, and identity of one or more SUs of SU set B.

Each SU receiving the partially encoded slice request generates a second decode threshold number of partially encoded slices based on the first dispersed storage error coding function parameters and the second dispersed storage error coding function parameters. The partially encoded slice includes a result of a partial encoded data slice (EDS) generation function including obtaining an encoding matrix of the first DS parameters, reducing the encoding matrix to produce a square matrix that exclusively includes rows associated with a first decode threshold number of SUs of the first set of SUs, inverting the square matrix to produce an inverted matrix, matrix multiplying the inverted matrix by an EDS associated with the SU to produce a vector, and matrix multiplying the vector by one or more rows of an encoding matrix associated with the second DS parameters to produce the partially EDS(s).

The SU outputs the second decode threshold number of partially encoded slices to a second decode threshold number of SUs of the SU set B. For example, SU A1 outputs the partial encoded slices for new slices 1-3 (e.g., to be stored at SUs B1-B3) to SUs B1-B3 based on a previous slice 1 stored at SU A1.

Each SU of the second decode threshold number of SUs of SU set B combines received partially encoded slices to produce a corresponding new EDS for storage therein. For example, SU B performs an exclusive OR function to combine partially encoded slice (new 2, old 1) and partially encoded slice (new 2, old 2) to produce new slice 2 for storage therein. In addition, the system may generate slices for more than the second decode threshold number of SUs of SU set B. For example, a similar partial encoding approach may be utilized to generate a new slice 4 based on generating and combining partially encoded slices for new slice 4 based on new slices 1-3.

In an example of operation and implementation, a storage unit (SU) includes an interface configured to interface and communicate with a dispersed or distributed storage network (DSN), a memory that stores operational instructions, and a processing module, processor, and/or processing circuitry operably coupled to the interface and memory. The processing module, processor, and/or processing circuitry is configured to execute the operational instructions to perform various operations, functions, etc. In some examples, the processing module, processor, and/or processing circuitry, when operable within the SU based on the operational instructions, is configured to perform various operations, functions, etc. In certain examples, the processing module, processor, and/or processing circuitry, when operable within the SU is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, a SU of SU set A (e.g., SU A1) is configured to receive a partially encoded slice request of a plurality of partially encoded slice requests, from computing device 910 and issued from the computing device 910 to a first decode threshold number of storage units (SUs) of a SU set A that includes the SU A1, to restore a set of encoded data slices (EDSs) associated with a data object that is distributedly stored within the SU set A based on first dispersed storage error coding function parameters that include the first decode threshold number. Again, note that the SU A1 includes one of the first decode threshold number of SUs of the SU set A. Note also that the data object is segmented into a plurality of data segments, and a data segment of the plurality of data segments is dispersed error encoded in accordance with the first dispersed storage error coding function parameters to produce the set of EDSs. The SU of SU set A (e.g., SU A1) is also configured to generate, based on the partially encoded slice request, a second decode threshold number of partially encoded data slices (EDSs) based on the first dispersed storage error coding function parameters and second dispersed storage error coding function parameters. Then, the SU of SU set A (e.g., SU A1) is configured to output the second decode threshold number of partially EDSs to a second decode threshold number of SUs of a SU set B to undergo selective combination respectively within SUs of the second decode threshold number of SUs of the SU set B to generate new EDSs for storage within the SUs of the second decode threshold number of SUs of the SU set B.

In some examples, the first dispersed storage error coding function parameters include the first decode threshold number, a first read threshold number, a first write threshold number, and a first pillar width, and a first pillar number. A first decode threshold number of EDSs are needed to recover the data segment, a first read threshold number of EDSs provides for reconstruction of the data segment, and a first write threshold number of EDSs provides for a successful transfer of the set of EDSs from a first at least one location in the DSN to a second at least one location in the DSN. Also, the set of EDSs is of the first pillar width and includes a first pillar number of EDSs. In certain examples, each of the first decode threshold number, the first read threshold number, and the first write threshold number is less than the first pillar number. Also, the first write threshold number is greater than or equal to the first read threshold number that is greater than or equal to the first decode threshold number. The second dispersed storage error coding function parameters may include same of different parameters than the first dispersed storage error coding function parameters. In some examples, the second dispersed storage error coding function parameters include a second decode threshold number, a second read threshold number, a second write threshold number, a second pillar width, and/or a second pillar number.

Also, in certain examples, the second dispersed storage error coding function parameters are selected (e.g., by the computing device 910) in accordance with the partially encoded slice request to provide improvement of a reliability level, a performance level, a storage level, and/or a storage cost that is provided by the first dispersed storage error coding function parameters. Note that the partially encoded slice request may include any one or more of a first decoding matrix, a second encoding matrix, a slice name, a slice name range, the first dispersed storage error coding function parameters, the second dispersed storage error coding function parameters, and/or identity of one or more SUs of the SU set B.

In some examples, the SU is also configured to generate the second decode threshold number of partially EDSs in accordance with a partial encoded data slice generation function including to obtain an encoding matrix of the first dispersed storage error coding function parameters. The SU is also configured to reduce the encoding matrix to produce a square matrix that exclusively includes rows associated with the first decode threshold number of SUs of the SU set A, invert the square matrix to produce an inverted matrix, matrix multiply the inverted matrix by an EDS associated with the SU to produce a vector, and matrix multiply the vector by one or more rows of an encoding matrix associated with the second dispersed storage error coding function parameters to produce at least one of the second decode threshold number of partially EDSs.

In addition, in some example, the selective combination respectively within SUs of the second decode threshold number of SUs of the SU set B (e.g., by SU B1 of the SU set B) operates to generate new EDSs for storage within the SUs of the second decode threshold number of SUs of the SU set B includes another SU of the SU set B to perform an exclusive OR function to combine a first partially EDS from the SU and a second partially EDS from another SU of the first decode threshold number of SUs of the SU set A to generate a new EDS for storage within the another SU of the SU set B.

Note that any SU of the SU set A or the SU set B may be located at a first premises that is remotely located from a second premises of at least one other SU of the SU set A and/or the SU set B within the DSN.

Note also that the computing device 910 may be implemented as any of a variety of devices including another SU of the SU set A and/or the SU set B within the DSN, a wireless smart phone, a laptop, a tablet, a personal computers (PC), a work station, or a video game device. Also, note also that the DSN may be implemented to include or be based on any of a number of different types of communication systems including a wireless communication system, a wire lined communication system, a non-public intranet system, a public internet system, a local area network (LAN), and/or a wide area network (WAN).

Figure 10:
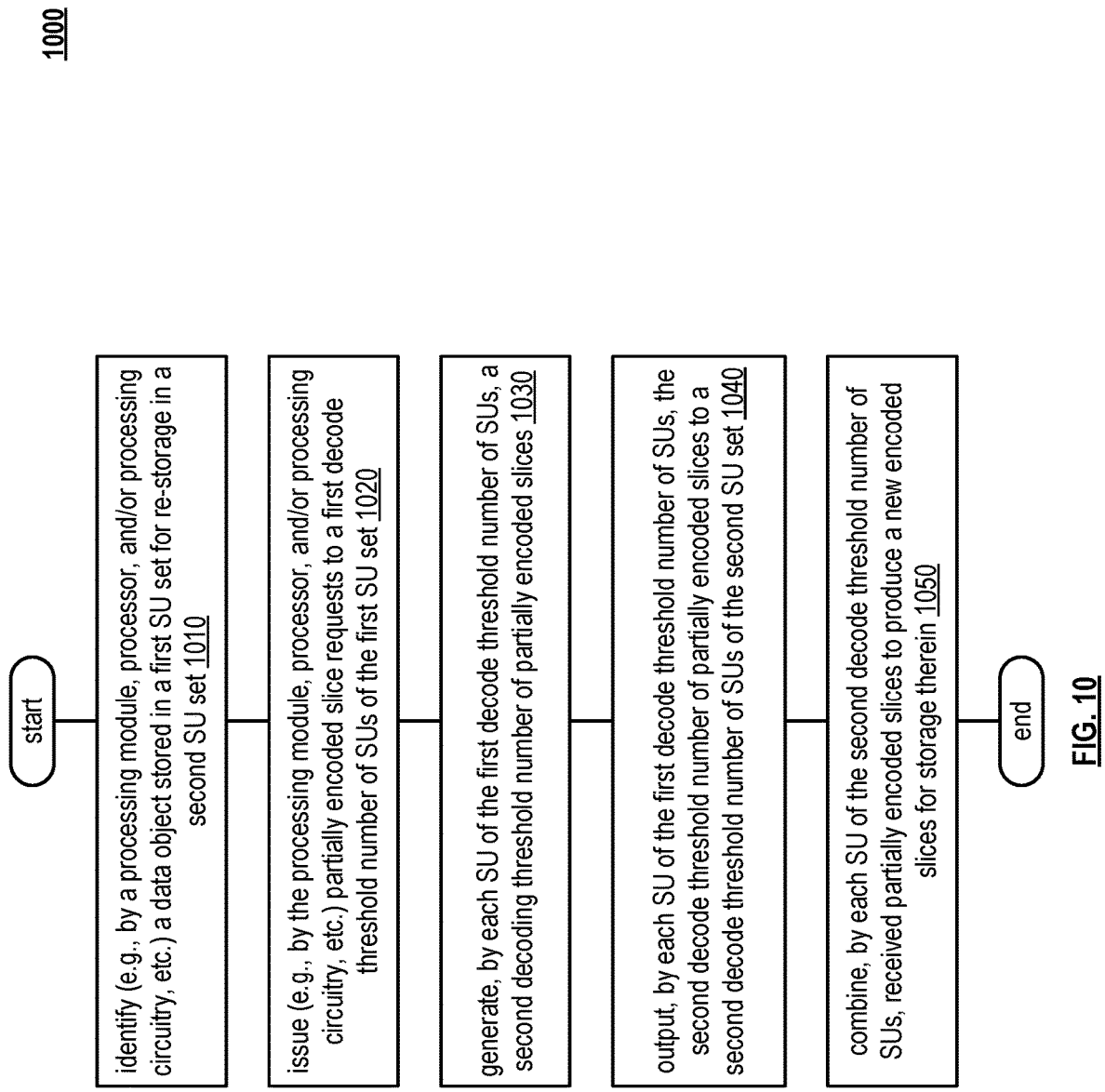
FIG. 10 is a flowchart illustrating an example of changing data storage parameters in accordance with the present invention.

FIG. 10 is a flowchart illustrating an example of changing data storage parameters in accordance with the present invention. This diagram includes a flowchart illustrating an example of changing data storage parameters. The method 1000 begins at a step 1010 where a processing module (e.g., of a computing device, SU, and/or other device) identifies a data object stored in a first dispersed storage (DS) unit set for re-storage in a second SU set. The method 1000 continues at the step 1020 where the processing module issues partially encoded slice requests to a first decode threshold number of SUs of the first SU set. The method 1000 continues at the step 1030 where each SU of the first decode threshold number of SUs generates a second decoding threshold number of partially encoded slices. Alternatively, or in addition to, the SU may generate more than the second decode threshold number of partially encoded slices. The method 1000 continues at the step 1040 where each SU of the first decode threshold number of SUs outputs the second decode threshold number of partially encoded slices to a second decode threshold number of SUs of the second SU set. Alternatively, or in addition to, the SU may output more than the second decode threshold number of partially encoded slices to remaining SUs of the second SU set. The method 1000 continues at the step 1050 where each SU of the second decode threshold number of SUs combines (e.g., exclusive OR) received partially encoded slices to produce a new encoded slice for storage therein.

Figure 11:
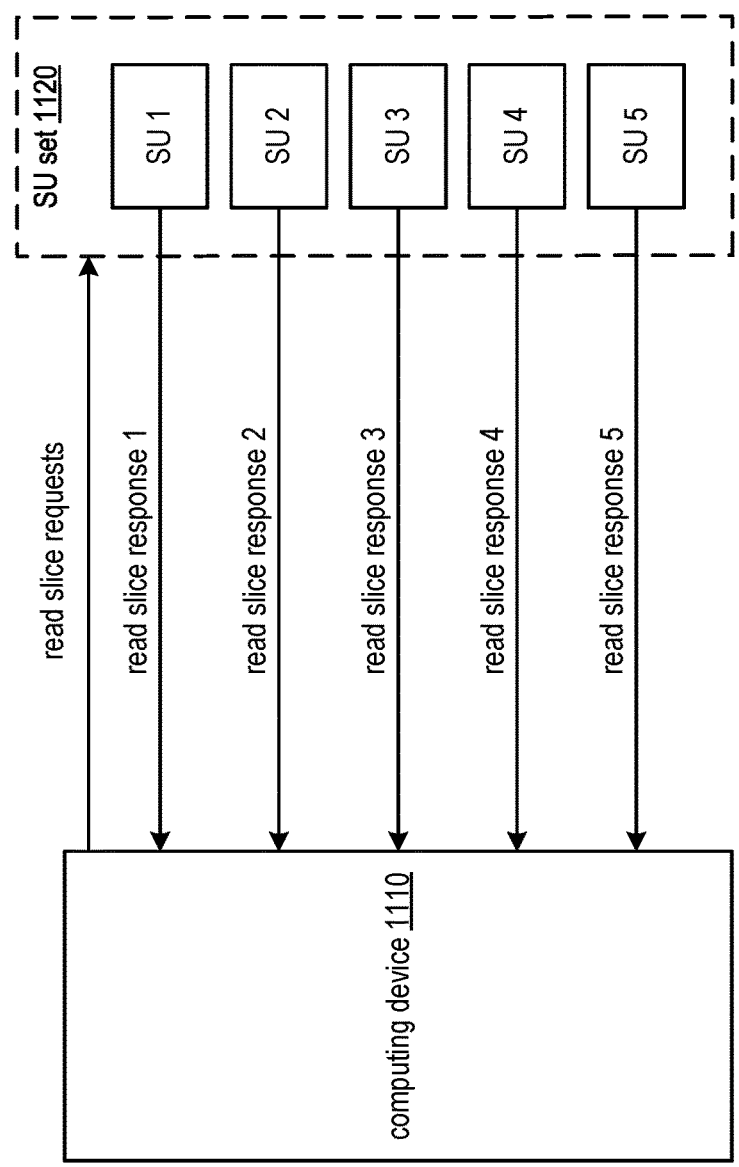
FIG. 11 is a schematic block diagram of another embodiment of a distributed computing system in accordance with the present invention.

FIG. 11 is a schematic block diagram of another embodiment of a distributed computing system in accordance with the present invention. This diagram includes a schematic block diagram of another embodiment of a distributed computing system that includes a computing device 1110 and a SU set 1120. The SU set 1120 includes a set of SUs. Each SU may be implemented by one or more of a storage unit (SU), a storage server, a distributed computing server, a memory module, a memory device, a user device, a computing device, and a DS processing unit. The computing device 1110 may be implemented utilizing one or more of a computing device, a SU, a storage server, a distributed computing server, a user device, a DS processing unit, and a SU of the SU set 1120.

The system functions to efficiently rebuild data by obtaining at least a decode threshold number of encoded data slices (EDSs) from the SU set when undesirable time delays are associated with the obtaining of the at least the decode threshold number of EDSs. The computing device 1110 issues at least a decode threshold number of read slice requests to the SU set and one or more receives read slice responses from one or more of the SUs of the SU set at varying time frames relative to the issuing of the read slice requests. The computing device 1110 temporarily stores one or more received slices from the one or more read slice responses.

The computing device 1110 determines whether a decode threshold number of received slices are available within a receiving time frame from the issuing of the read slice requests. The receiving time frame may be an average target time window where it is expected to receive the at least the decode threshold number of slices. When the decode threshold number of received slices are available, the computing device 1110 decodes the decode threshold number of receives slices to reproduce the slice to be rebuilt. When the decode threshold number of receives slices are not available, for each received slice, the computing device 1110 generates a partially encoded slice for the slice to be rebuilt based on the received slice and then deletes each received slice (e.g., to save memory). Next, the computing device 1110 combines two or more partially encoded slices to produce a partially encoded slice to be rebuilt. For example, the computing device 1110 performs an exclusive OR function on the partial encoded slices to produce the partially encoded slice to be rebuilt. The computing device 1110 temporarily stores the partially encoded slice to be rebuilt and deletes the partially encoded slices (e.g., to save memory). As more slices are received, through the final receives slice of the decode threshold number of receives slices, the computing device 1110 generates another partially encoded slice, combines the partially encoded slice with the partially encoded slice to be rebuilt to generate an updated partially encoded slice to be rebuilt.

Figure 12:
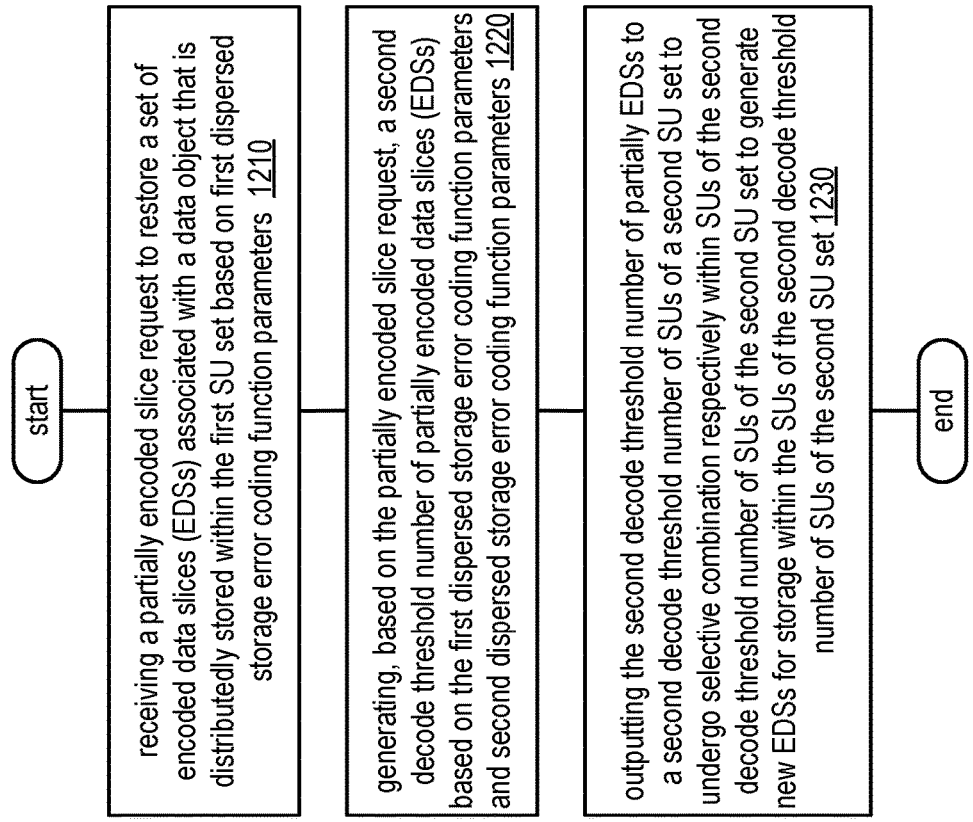
FIG. 12 is a diagram illustrating an embodiment of a method for execution by one or more computing devices and/or storage units (SUs) in accordance with the present invention.

FIG. 12 is a diagram illustrating an embodiment of a method 1200 for execution by one or more computing devices and/or storage units (SUs) in accordance with the present invention. The method 1200 operates in step 1210 by receiving a partially encoded slice request of a plurality of partially encoded slice requests to restore a set of encoded data slices (EDSs) associated with a data object. The data object is distributedly stored within the first SU set based on first dispersed storage error coding function parameters that include the first decode threshold number. Note that the partially encoded slice request may be received via an interface of the SU that is configured to interface and communicate with a dispersed or distributed storage network (DSN) and be issued from the computing device to a first decode threshold number of storage units (SUs) of a first SU set that includes the SU executing the method 1200.

Note that the SU includes one of the first decode threshold number of SUs of the first SU set. Also, the data object is segmented into a plurality of data segments, and a data segment of the plurality of data segments is dispersed error encoded in accordance with the first dispersed storage error coding function parameters to produce the set of EDSs.

The method 1200 then continues in step 1220 by generating, based on the partially encoded slice request, a second decode threshold number of partially encoded data slices (EDSs) based on the first dispersed storage error coding function parameters and second dispersed storage error coding function parameters. The method 1200 then operates in step 1220 by outputting the second decode threshold number of partially EDSs to a second decode threshold number of SUs of a second SU set to undergo selective combination respectively within SUs of the second decode threshold number of SUs of the second SU set to generate new EDSs for storage within the SUs of the second decode threshold number of SUs of the second SU set.

This disclosure presents, among other things, partial rebuilding techniques that begins by requesting partially encoded slices from at least an information dispersal algorithm (IDA) threshold of systems. In an example of operation and implementation, each slice is processed through a first IDA decode method that corresponds to the IDA decode operation for the IDA which produced that slice. Next, the partially decoded source data resulting from each decoded slice (in isolation) is re-encoded through a second IDA (e.g., multiplied by a Reed-Solomon encoding matrix) to yield one or more partially re-encoded slices. The partially encoded slices may even have a different configuration, such as a different width, among other different characteristics. The encoded partial slices from at least a threshold of systems can then be combined to yield the newly encoded slices. In a ZIG-based recombination, each partial is encrypted such that the combination of the threshold number of partials yields the same encoded slice (without divulging information about the slices used). As replication is a special case of threshold based storage (1-of-N), such a scheme may also be used to convert replicated storage to dispersed storage and vice versa.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a storage network;
memory that stores operational instructions; and
processing circuitry operably coupled to the interface and to the memory, wherein the processing circuitry is configured to execute the operational instructions, to:
determine to restore data stored in a first set of storage units (SUs) within the storage network in accordance with first dispersed storage error coding function parameters to be stored in a second set of SUs within the storage network in accordance with second dispersed storage error coding function parameters, wherein the data includes a data object that is segmented into a plurality of data segments, wherein a data segment of the plurality of data segments is dispersed error encoded in accordance with the first dispersed storage error coding function parameters to produce a set of encoded data slices (EDSs) that are distributedly stored in the first set of SUs, wherein a first decode threshold number of EDSs are needed to recover the data segment;
generate a plurality of partially encoded slice requests; and
issue, via the interface, the partially encoded slice requests to at least a first decode threshold number of SUs of the first set of SUs to instruct a SU of the at least a first decode threshold number of SUs of the first set of SUs to generate a second decode threshold number of partially EDSs based on the first dispersed storage error coding function parameters and the second dispersed storage error coding function parameters to be combined to generate a new set of EDSs to be stored in the second set of SUs.

2. The computing device of claim 1, wherein a partially encoded slice request of the plurality of partially encoded slice requests includes at least one of a first decoding matrix, a second encoding matrix, a slice name, a slice name range, the first dispersed storage error coding function parameters, the second dispersed storage error coding function parameters, or identity of one or more SUs of the second set of SUs.

3. The computing device of claim 1, wherein the second decode threshold number of partially EDSs undergo selective combination respectively within SUs of the second decode threshold number of SUs of the second set of SUs to generate the new EDSs to be stored in the second set of SUs.

4. The computing device of claim 1, wherein the processing circuitry is further configured to execute the operational instructions to:
select the second dispersed storage error coding function parameters to provide improvement of at least one of a reliability level, a performance level, a storage level, or a storage cost that is provided by the first dispersed storage error coding function parameters, wherein a partially encoded slice request of the plurality of partially encoded slice requests includes the second dispersed storage error coding function parameters.

5. The computing device of claim 1, wherein a partially EDS of the second decode threshold number of partially EDSs includes a result of a partial EDS generation function including:
obtaining an encoding matrix of the first dispersed storage error coding function parameters;
reducing the encoding matrix to produce a square matrix that exclusively includes rows associated with the first decode threshold number of SUs of the first set of SUs;
inverting the square matrix to produce an inverted matrix;
matrix multiplying the inverted matrix by an EDS associated with an SU of the first decode threshold number of SUs of the first set of SUs to produce a vector; and
matrix multiplying the vector by one or more rows of an encoding matrix associated with the second dispersed storage error coding function parameters to produce at least one of the second decode threshold number of partially EDSs.

6. The computing device of claim 1, wherein the first set of SUs includes a first number of SUs, and the second set of SUs includes a second number of SUs.

7. The computing device of claim 1, wherein:
the first dispersed storage error coding function parameters include the first decode threshold number, a first read threshold number, a first write threshold number, and a first pillar width, and a first pillar number;
a first decode threshold number of EDSs are needed to recover the data segment;
a first read threshold number of EDSs provides for reconstruction of the data segment;
a first write threshold number of EDSs provides for a successful transfer of the set of EDSs from a first at least one location in the storage network to a second at least one location in the storage network;
the set of EDSs is of the first pillar width and includes a first pillar number of EDSs;
each of the first decode threshold number, the first read threshold number, and the first write threshold number is less than the first pillar number;
the first write threshold number is greater than or equal to the first read threshold number that is greater than or equal to the first decode threshold number; and
the second dispersed storage error coding function parameters include at least one of the second decode threshold number, a second read threshold number, a second write threshold number, a second pillar width, or a second pillar number.

8. The computing device of claim 1, wherein a SU of the first set of SUs is located at a first premises that is remotely located from a second premises of at least one other SU of the first set of SUs or the second set of SUs.

9. The computing device of claim 1, wherein the computing device includes a SU of the first set of SUs or the second set of SUs within the storage network, a wireless smart phone, a laptop, a tablet, a personal computers (PC), a work station, or a video game device.

10. The computing device of claim 1, wherein the storage network includes at least one of a wireless communication system, a wire lined communication system, a non-public intranet system, a public internet system, a local area network (LAN), or a wide area network (WAN).

11. A method for execution by a computing device, the method comprising:
determining to restore data stored in a first set of storage units (SUs) within a storage network in accordance with first dispersed storage error coding function parameters to be stored in a second set of SUs within the storage network in accordance with second dispersed storage error coding function parameters, wherein the data includes a data object that is segmented into a plurality of data segments, wherein a data segment of the plurality of data segments is dispersed error encoded in accordance with the first dispersed storage error coding function parameters to produce a set of encoded data slices (EDSs) that are distributedly stored in the first set of SUs, wherein a first decode threshold number of EDSs are needed to recover the data segment;

generating a plurality of partially encoded slice requests; and issuing via an interface of the computing device that is configured to interface and communicate with the storage network, the partially encoded slice requests to at least a first decode threshold number of SUs of the first set of SUs to instruct a SU of the at least a first decode threshold number of SUs of the first set of SUs to generate a second decode threshold number of partially EDSs based on the first dispersed storage error coding function parameters and the second dispersed storage error coding function parameters to be combined to generate a new set of EDSs to be stored in the second set of SUs.

12. The method of claim 11, wherein a partially encoded slice request of the plurality of partially encoded slice requests includes at least one of a first decoding matrix, a second encoding matrix, a slice name, a slice name range, the first dispersed storage error coding function parameters, the second dispersed storage error coding function parameters, or identity of one or more SUs of the second set of SUs.

13. The method of claim 11, wherein the second decode threshold number of partially EDSs undergo selective combination respectively within SUs of the second decode threshold number of SUs of the second set of SUs to generate the new EDSs to be stored in the second set of SUs.

14. The method of claim 11 further comprising:

selecting the second dispersed storage error coding function parameters to provide improvement of at least one of a reliability level, a performance level, a storage level, or a storage cost that is provided by the first dispersed storage error coding function parameters, wherein a partially encoded slice request of the plurality of partially encoded slice requests includes the second dispersed storage error coding function parameters.

15. The method of claim 11, wherein a partially EDS of the second decode threshold number of partially EDSs includes a result of a partial EDS generation function including:

obtaining an encoding matrix of the first dispersed storage error coding function parameters;

reducing the encoding matrix to produce a square matrix that exclusively includes rows associated with the first decode threshold number of SUs of the first set of SUs;

inverting the square matrix to produce an inverted matrix;

matrix multiplying the inverted matrix by an EDS associated with an SU of the first decode threshold number of SUs of the first set of SUs to produce a vector; and matrix multiplying the vector by one or more rows of an encoding matrix associated with the second dispersed storage error coding function parameters to produce at least one of the second decode threshold number of partially EDSs.

16. The method of claim 11, wherein the first set of SUs includes a first number of SUs, and the second set of SUs includes a second number of SUs.

17. The method of claim 11, wherein:

the first dispersed storage error coding function parameters include the first decode threshold number, a first read threshold number, a first write threshold number, and a first pillar width, and a first pillar number;

a first decode threshold number of EDSs are needed to recover the data segment;

a first read threshold number of EDSs provides for reconstruction of the data segment;

a first write threshold number of EDSs provides for a successful transfer of the set of EDSs from a first at least one location in the storage network to a second at least one location in the storage network;

the set of EDSs is of the first pillar width and includes a first pillar number of EDSs;

each of the first decode threshold number, the first read threshold number, and the first write threshold number is less than the first pillar number;

the first write threshold number is greater than or equal to the first read threshold number that is greater than or equal to the first decode threshold number; and the second dispersed storage error coding function parameters include at least one of the second decode threshold number, a second read threshold number, a second write threshold number, a second pillar width, or a second pillar number.

18. The method of claim 11, wherein a SU of the first set of SUs is located at a first premises that is remotely located from a second premises of at least one other SU of the first set of SUs or the second set of SUs.

19. The method of claim 11, wherein the computing device includes a SU of the first set of SUs or the second set of SUs within the storage network, a wireless smart phone, a laptop, a tablet, a personal computers (PC), a work station, or a video game device.

20. The method of claim 11, wherein the storage network includes at least one of a wireless communication system, a wire lined communication system, a non-public intranet system, a public internet system, a local area network (LAN), or a wide area network (WAN).

* * * * *